MOTION PICTURE FILM AND REPRODUCING APPARATUS THEREFOR

Filed April 12, 1962 2 Sheets-Sheet 1

INVENTORS
PETER C. GOLDMARK
JOHN M. HOLLYWOOD
BY
Brumbaugh, Free, Graves & Donohue
ATTORNEYS

INVENTORS
PETER C. GOLDMARK
JOHN M. HOLLYWOOD

BY Brumbaugh, Free, Graves & Donohue

ATTORNEYS 3,290,437

MOTION PICTURE FILM AND REPRODUCING APPARATUS THEREFOR

Peter C. Goldmark, Stamford, and John M. Hollywood, Greenwich, Conn., assignors to Columbia Broadcasting System, Inc., New York, N.Y., a corporation of New York Filed Apr. 12, 1962, Ser. No. 187,035
15 Claims. (Cl. 178—5.6)

This invention relates to apparatus for reproducing information recorded on a record medium. More particularly, it relates to apparatus for generating electrical signals representative of video and sound information recorded on photographic film.

There is considerable interest nowadays in the use of motion picture films for educational purposes and as entertainment in educational institutions, hospitals, and the like. However, both the conventional motion picture film and the equipment used heretofore for its projection by their very natures have imposed severe limitations upon the effectiveness of the motion picture medium for these applications. Thus, film made according to existing standards is bulky and therefore presents problems in distribution and handling. Moreover, each showing requires a relatively darkened room, an operator, a relatively expensive projection machine, a motion picture film, and a screen in unobstructed spaced apart relation to the projector.

As a result, considerations of economy limit the showing of a film to a large group at a single location and preclude the viewing of the film by a number of people all at different locations, such as, for example, patients in various rooms and wards of a hospital or pupils in different classrooms.

The present invention overcomes the above noted deficiencies of the prior art in part by utilizing an extremely small and thin film record which has recorded thereon picture information in a series of frames of pictures and sound information in an accompanying sound track. The film record may be approximately $1/10$ the size of a typical 35 mm. film record, for example, and thus a complete motion picture or television program may be recorded on a single reel of relatively small size which lends itself to easy distribution and handling.

In addition a reproducing system is provided which is not elaborate, is fabricated using relatively small components, and is adapted to produce an electrical signal which may be applied directly to the antenna terminal of a standard television receiver which is used as the ultimate reproducing means. Thus, the system is suitable for reproducing the film record simply, and is capable of "playing" to an audience composed of persons at different locations.

Briefly, the reproducing system comprises a film drive mechanism, such as a capstan arrangement utilizing no sprockets and requiring no corresponding sprocket holes in the film, which in itself reduces the minimum size of the film record. The drive mechanism conveys the film record through a scanning area, and as each picture frame in the film is driven through the area, an optical "film chasing" system scans the frame twice with a moving spot of light to provide two interlaced scansions of the frame. A photo multiplier detects the light transmitted through the scanned frame of the film and converts this into an electrical signal which is amplified and modified to produce a video signal.

During the scanning of each picture frame, an adjacent portion of the sound track is illuminated by a fixed light source to activate a photocell whose signal is amplified to produce a sound signal. The sound and video signals may be conveyed separately to independent sound and video reproducing units, or they may be mixed to provide a single signal which may be applied to the antenna terminals of one or more conventional television receivers for reproduction therein.

An important feature of the invention lies in the independent generation of blanking and synchronization signals which are added to the video signal and which are also applied to the scanning signal generating circuits that control the scanning action of the film scanning light spot. In particular, a unique control circuit is employed which synchronizes the scanning action to the passage of the frames on the film record through the scanning area.

To elaborate, a portion of the film record near each frame contains a synchronization marking which results in the generation by the photo multiplier of a signal of predetermined frequency when the marking is scanned by the light spot. A tuned detection circuit detects the signal, which is indicative of the passage of this portion of the film through the scanning area, and in response thereto gates a varying reference signal that is generated at the beginning of each vertical or field sweep of the light spot. The value of the varying reference signal at the time of gating is indicative of the time during a vertical sweep when the synchronization marking portion of the film record is scanned. This gated varying reference signal, thus, constitutes a correction signal which is used to vary the frequency of the vertical or field sweeps of the spot of light so that the frequency of scanning is equal to the frequency at which the picture frames pass through the scanning area. Additionally, the correction signal is used to vary the location of the scanning pattern so that it encompasses only a single picture frame on the film.

Time constants are introduced into the circuits controlling the frequency and location of the field sweeps of the light spot so that, in response to a given correction signal generated as described above, a shift in the location of the scanning pattern first occurs and next a shift in the frequency of the field sweeps occurs. In this fashion, an immediate correction is made to change the area scanned and, if this is not sufficient, an overall change in the frequency of field sweeps is effected to make this frequency equal to that at which the film frames move through the scanning area.

Other features of the invention include circuits for providing relatively constant light intensity of the scanning light beam and relatively uniform peak signal output from the photo multiplier.

A detailed description follows of the invention described in general terms above, which is to be read in conjunction with the appended drawings, in which:

FIGS. 1A and 1B taken together are a block diagram of a film reproducing system in accordance with the invention;

Figure 1A:
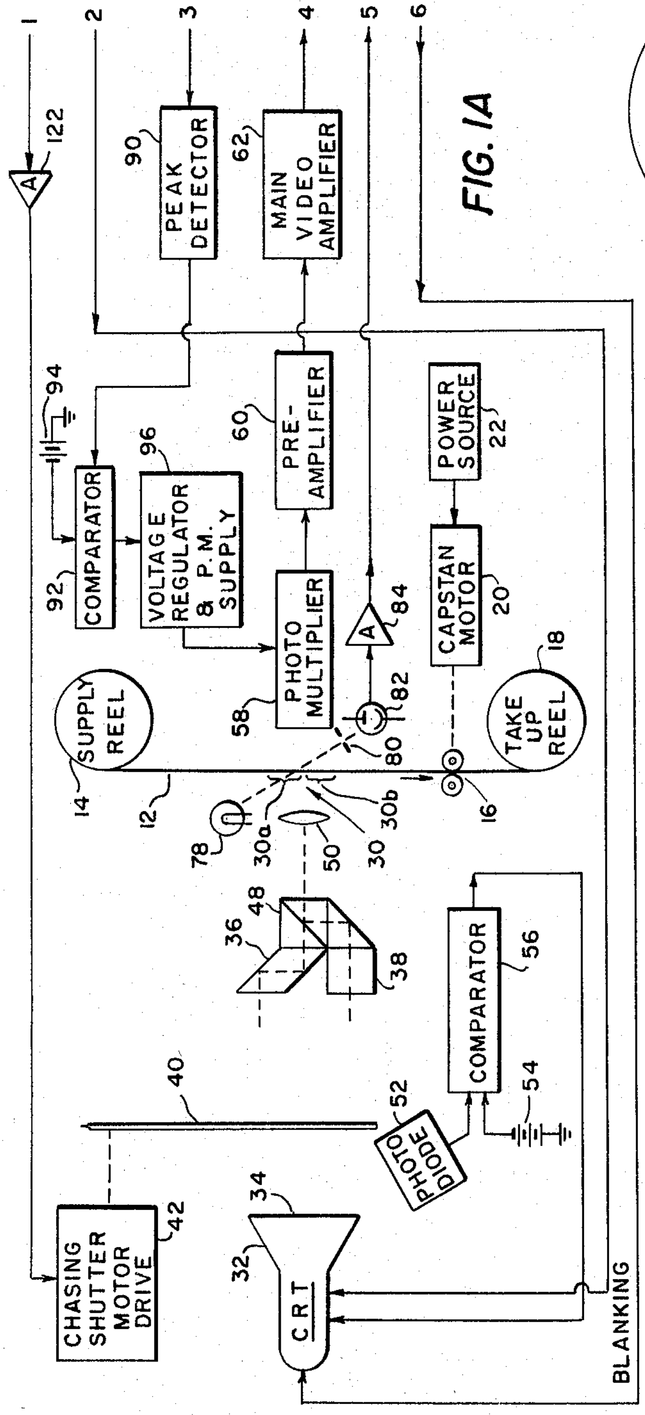
Figure 1B:
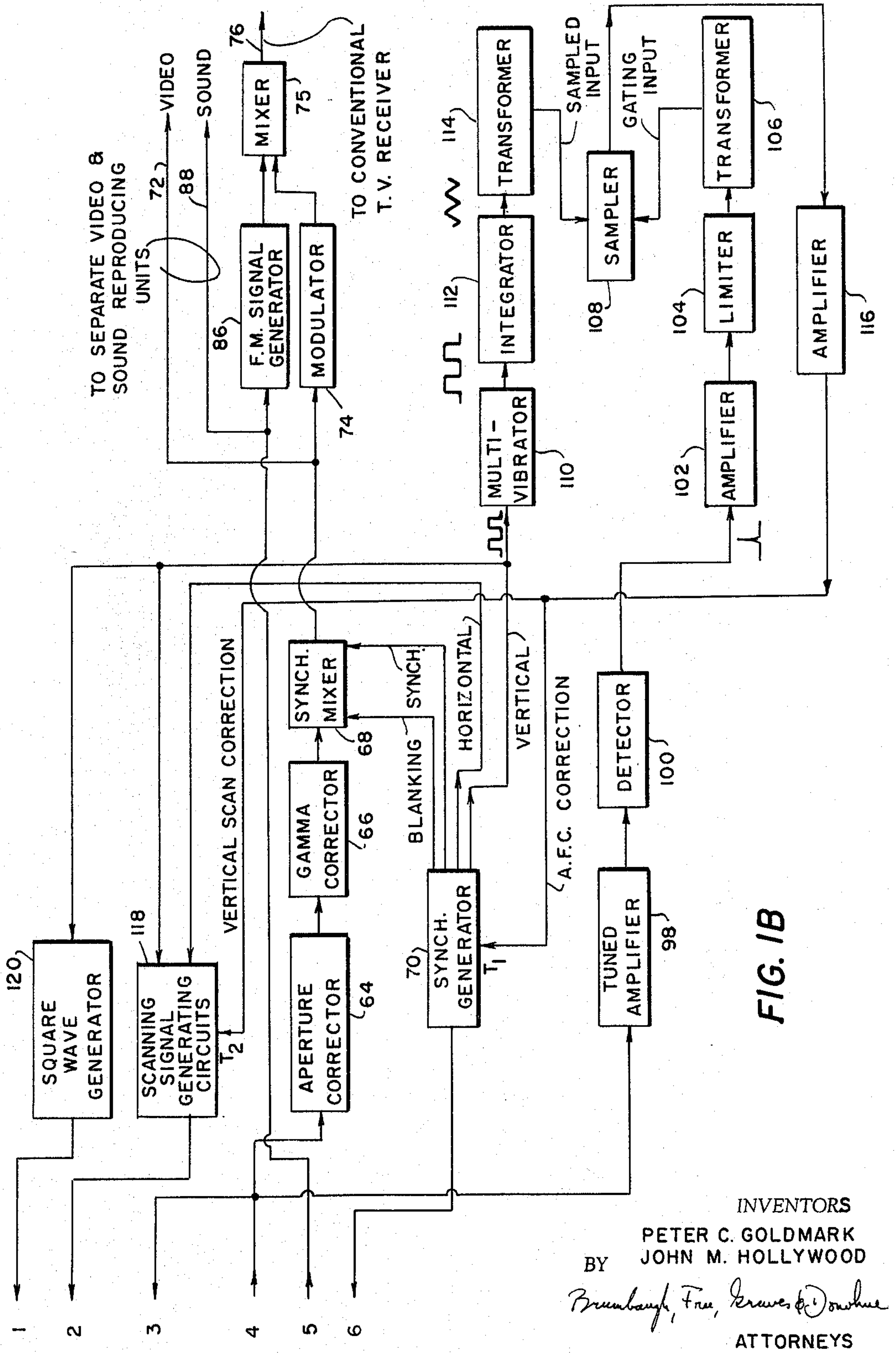

Referring to FIGS. 1A and 1B, a film record 12 carried on a supply reel 14 is driven continuously by a capstan arrangement 16 onto a takeup reel 18. The capstan arrangement 16, which utilizes no sprocket and therefore requires no sprocket holes on the film which unnecessarily take up film space, is driven in turn by a capstan motor 20 that is energized by an independent power source 22.

Figure 2:
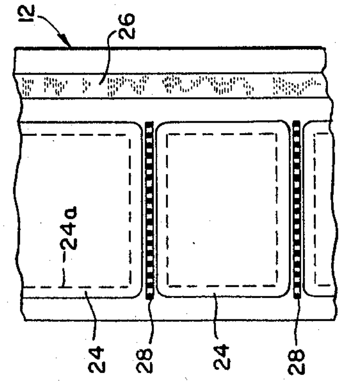
FIG. 2 is a portion of a film record, drawn to a greatly exaggerated scale, which carries information thereon that is to be reproduced.

A segment of the film record 12 is shown in FIG. 2, and comprises a series of frames 24 of picture information. Also carried on the film record 12 is a sound track 26 which may be a track of variable density, for example, as shown in the figure, in which the density or light transmissivity at any point on the track is indicative of the sound information carried thereon. The track, of course, may also be of variable area, although the invention, naturally, is not limited to either one of these particular sound track arrangements. Disposed between each of the frames 24 of the film record 12 is a marker portion 28 which is used to provide synchronization information. The marker portion is shown in detail in FIG. 3.

Figure 3:
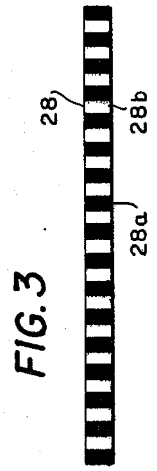
FIG. 3 is a portion of the film record of FIG. 2 illustrating the synchronization information that is recorded between adjacent picture frames.

To give an example of the film record 12 shown in FIG. 2, typically it is approximately only 249 mils or roughly ¼ inch wide and of a thickness between 1.5 and 3.5 mils. This, naturally, results in an extremely small and thin film record, which is another reason why a sprocket drive arrangement is not employed. Each picture frame 24 measures approximately 126 x 174 mils, with the portion 24*a* enclosed in dashed lines measuring approximately 123 x 164 mils. The portion 24*a* is that part of the frame 24 actually reproduced for viewing in remotely positioned television receivers. The sound track 26 is approximately 45 mils wide and the marker portion 28 measures approximately 3.5 x 173 mils. The relatively opaque markers 28*a* and the transparent portions 28*b* therebetween of FIG. 3 are approximately 5.25 mils wide.

*Film scanning apparatus*

As the film record 12 is driven by the capstan arrangement 16 from the supply reel 14 to the take-up reel 18, each of the frames 24 thereon is driven through a scanning area indicated generally by the numeral 30 in FIG. 1A. The film is scanned by a moving spot of light produced by a conventional cathode ray tube or flying spot scanner 32 which is part of a scanning arrangement similar to that disclosed in application Serial No. 187,025 filed April 12, 1962 in the name of Dennis Gabor for "Film Recording Reproducing Apparatus."

Figure 4:
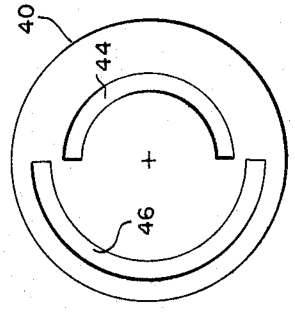
FIG. 4 is a plan view of a shutter which is used in the "film chasing" apparatus employed in the invention.

Briefly, the cathode ray tube 32 develops a spot of light which, for a film speed of 4 inches per second for the film of the dimensions given before, and in accordance with prevailing U.S. standards, sweeps across face 34 of the tube in line sweep fashion generally at the rate of 60 interlaced fields per second, each field being composed of 262½ scanning lines in a raster approximately 3.250 x 1.225 inches. A pair of parallel disposed 45° prisms 36 and 38 view the face 34 of the cathode ray tube 32 through a rotating shutter 40 which is shown in detail in FIG. 4. The shutter 40, which is driven by a chasing shutter motor drive 42, is composed of an opaque material and has two slits 44 and 46 cut therein. As the shutter rotates under the action of the motor drive 42, the slits 44 and 46 alternately unmask the prisms 36 and 38, respectively, to view the face 34 of the cathode ray tube.

Each of the prisms 36 and 38, acting in conjunction with a semi-reflecting and semi-transmitting beam splitting prism 48 and a lens 50, images in reduced size the cathode ray tube face 34 on the film 12 on a different side of an axis which passes through the center of the lens 50 and which is perpendicular to the film. Specifically, when the 45° prism 36 is unmasked by the shutter slit 44, the moving spot of light on the cathode ray tube face 34 is imaged on the portion of the scanning area 30 indicated generally as 30*a* in FIG. 1A. Similarly, when the 45° prism 38 is unmasked by the shutter slit 46, the moving spot of light is imaged on a portion 30*b* of the scanning area 30.

In this fashion, as the film 12 is drawn from the supply reel 14 to the takeup reel 18 and a single frame 24 moves continuously through the scanning area 30, a first complete field of line sweeps of the moving spot of light is directed toward the area 30*a*, and then a second complete field of line sweeps is directed toward the area 30*b*. Thus, each frame 24 on the film record 12 is scanned twice with two interlaced scansions. Since the film record 12 is continuously moving, each scansion encompasses an area which is actually equal to one half of a frame 24. However, because of the movement of the film, that movement and the movement of the light spot complete an effective sweep of the light spot over the entire frame.

To ensure that the light beam from the cathode ray tube 32 is of constant intensity, a control circuit comprising a photo diode 52, a source of reference potential 54 representing a standard light intensity, and a comparator 56 are employed. The photo diode 52 views the face 34 of the cathode ray tube 32 and generates a signal representative of the intensity of the spot of light produced by the tube. This signal is applied to one input of the comparator 56 which compares the signal with the potential of the reference source 54 and generates a correction signal equal to the difference between the two.

The correction signal, representing the deviation of the intensity of the light beam from the standard intensity, is applied to a beam control grid (not shown) in the cathode ray tube 32. In this fashion, cathode ray tube light beam intensity is monitored and controlled directly, which is in distinction to the type of control heretofore previously employed in which the electrical current supplied to the tube is sampled to give an indication of light intensity. The present arrangement avoids the difficulties encountered when, due to the aging of the cathode ray tube, the light intensity drops off after a period of time for a given beam current.

*Video and sound reproducing section*

A photo multiplier 58 detects the light from the scanning light spot that is transmitted through the film record 12 and develops an electrical signal representative thereof. The signal from the photo multiplier 58 is applied to a preamplifier 60 and thence to a main video amplifier 62. The signal from the main video amplifier 62 is applied to a conventional aperture corrector 64, similar, for example, to that disclosed in U.S. Patent No. 3,011,018 granted to M. V. Sullivan, which modifies the signal to correct for aperture distortion. The signal from the aperture corrector 64 is applied to a conventional gamma corrector 66, similar, for example, to that disclosed in U.S. Patent No. 2,697,758 granted to R. V. Little, which modifies the signal to correct for the nonlinear gamma characteristic of the film record 12.

The main video signal from the gamma corrector 66 is applied to a synchronization mixer 68 which also has applied thereto a series of blanking and synchronization signals from a synchronization generator 70 which are added to the main video signal. The blanking signal added to the main video signal provides a blanking of that signal upon reproduction so that only that portion of the main video signal representative of the sweeping of the light spot through the portion 24*a* of the film record 12 of FIG. 2 is reproduced. The blanking signal, of course, also provides for blanking of that portion of the main video signal that occurs during horizontal and vertical retrace of the light spot, and the synchronization signal provides for synchronization during reproduction.

The signal from the synchronization mixer 68 is applied to an output lead 72 which may be coupled to remote video reproducing units (not shown). The signal is also applied to a modulator 74 which produces a frequency modulated signal that is applied to one input of a mixer 75. A sound signal from an FM signal generator 86 is applied to the other input of the mixer 75 which produces a composite video and sound signal that is applied via a conductor 76 to remote, conventional television receivers (not shown).

The sound signal which is added to the video signal in the mixer 75 is developed as follows. As shown in FIG. 1A, a light source 78 illuminates that portion of the sound track 26 of the film record 12 that is passing through the scanning area 30. The light transmitted through the sound track 26 passes through a mask 80 to a photocell 82. The output signal from the photocell 82 is amplified in an amplifier 84 to produce a signal representative of the sound information carried on the track 26. The signal from the amplifier 84 is applied directly to a lead 88 which is coupled to remote sound reproducing units (not shown), such as conventional audio amplifiers and loudspeakers, for example, to reproduce the sound information carried on the film track 26. The signal from the amplifier 84 is also applied to the FM signal generator 86 which generates a frequency modulated signal that is added in the mixer 75 to the main video signal from the modulator 74 to produce a composite signal on the conductor 76.

The video and sound system also includes a control circuit for regulating the peak output signal from the photo multiplier 58 so that it is relatively uniform for a peak light input. This is accomplished in the following fashion. A peak detector 90 detects the peak magnitude of the signal from the main video amplifier 62 which represents the light transmitted through a transparent portion of the film record 12. The signal from the peak detector 90 is applied to a comparator 92 which compares the signal against the potential of a reference source 94 which represents a standard peak signal. Any difference between these two signals produces a correction signal from the comparator 92 which is applied to a voltage regulator and photo multiplier supply circuit 96 to change the magnitude of a biasing signal applied to the photo multiplier 58. In this fashion, peak signals from the photo multiplier are rendered fairly uniform.

*Synchronization section*

The synchronization of the scanning of the light spot produced by the cathode ray tube 32 to the movement of the film record 12 is accomplished as follows. First, referring to FIG. 2, it may be seen that the synchronization markers 28 are disposed between adjacent frames 24 of the film record 12. For the film dimensions, film speed, and the scanning rate of the light spot given previously, approximately 7 scanning lines are required for the light spot to sweep by the synchronization markers. As the beam sweeps by the spaced opaque and transparent portions 28*a* and 28*b*, a pulse signal is produced in the photo multiplier 58. For the dimensions given previously as to the size of the markers 28*a* and 28*b* and the scanning speed, the signal developed in the photo multiplier 58 is of a frequency approximately equal to 300 kilocycles. This frequency, of course, is completely arbitrary.

A tuned amplifier 98 (FIG. 1B) is coupled to the main video amplifier 62 and is tuned to a frequency equal to that of the signal produced by the sweeping of the light spot by the synchronization markers 28. In the example chosen, the amplifier 98 is tuned to a frequency of 300 kilocycles. The signal from the tuned amplifier 98 is applied to a detector 100 which generates a pulse signal in response thereto that is applied to an amplifier 102. The output of the amplifier 102 is limited in a limiter 104 whose output is applied to a transformer 106 used for signal "floating" purposes. The signal from the transformer 106, "floated" above ground, is applied as a gating input to a sampler 108.

Applied to the sampled input terminal of the sampler 108 is a signal of triangular wave form which is generated as follows. Vertical synchronization pulses from the synchronization generator 70, which are used to trigger the vertical sweep of the light beam in the cathode ray tube 32, are applied to a multivibrator 110. The multivibrator 110 produces a pulse signal that is applied to an integrator 112 which, in turn, develops a signal of triangular waveform as indicated in FIG. 1B. Specifically, the signal increases linearly from a base potential to a peak potential from which it decreases linearly back to the base potential. The pulses from the multivibrator 110 as integrated by the integrator 112 are chosen so that the signal of triangular waveform commences from a reference potential midway between the base and peak potentials, increasing to the peak potential and then decreasing back to the reference potential during the first one-half portion of a vertical field sweep of the spot of light from the cathode ray tube 32, and then decreasing from the reference potential to the base potential and thereafter increasing back to the reference potential during the remaining half of the field sweep.

The signal of triangular waveform is applied to a transformer 114 which is used to "float" the signal above ground and which couples the signal as a sampled input signal to the sampler 108. When the pulse from the transformer 106 gates the sampler 108, the sampler produces as an output signal that value of the sampled input signal from the transformer 114 at the instant of sampling. As may be seen, then, the sampler produces an output signal which is indicative of the time during a field sweep of the scanning light spot when the spot is sweeping by the synchronization markers 28 on the film record 12. Ideally, the light beam should sweep by the markers at the end of a field sweep and, therefore, the output signal from the sampler 108 should be equal to the reference potential of the signal of triangular waveform from the integrator 112.

The output from the sampler 108 is used as a correction signal which is applied to an amplifier 116 and thence to the synchronization generator 70 and to scanning signal generating circuits 118. As applied to the synchronization generator 70, the correction signal from the amplifier 116 constitutes an automatic frequency control correction signal which varies the frequency of the vertical pulses generated by the synchronization generator 70 that are used to initiate the field sweep of the scanning light spot. This changes the frequency of the field sweep so that it conforms and adjusts itself to the frequency at which the frames 24 of the film record 12 pass through the scanning areas 30*a* or 30*b*.

Thus, the film frames 24 pass through the scanning area 30 generally at a rate of 30 frames per second, i.e., at a rate of 60 frames per second through each of the areas 30*a* and 30*b*, and this results in a field scanning rate of 60 scansions per second.

As applied to the scanning signal generating circuits, the signal from the amplifier 116 is a vertical scan correction signal. To elaborate, the scanning signal generating circuits have applied thereto horizontal and vertical synchronization pulses which trigger the generation of sweep signals that are applied to the cathode ray tube 32 and which result in the line and field sweeps, respectively, of the scanning light spot. The vertical scan correction signal from the amplifier 116 varies the vertical field sweep signal generated by the generator 118, thereby to shift the position of the field sweep so that it encompasses a frame on the film record 12.

The time constants associated with the scanning signal generating circuits 118 and the synchronization generator 70 may be adjusted and proportioned so that the scanning signal generating circuits 118 respond more quickly to the correction signal from the amplifier 116 than does the synchronization generator 70. In this fashion, a signal from the amplifier 116 first manifests itself in a change in the field sweep location, and if this is not sufficient to provide a complete correction in the sweep, a later change in the field sweep frequency is made.

As may be noted, the synchronization generator 70 is an independently running pulse generator whose vertical pulse frequency is variable in accordance with the correction signal from the amplifier 116. Besides being applied to the scanning signal generating circuits 118, the vertical pulses are also applied to a square wave generator 120. Signals from the generator 120, in turn, are applied after amplification in an amplifier 122 to the casing shutter motor drive 42 and supply the power to the motor. In this fashion, the shutter 40, which is used alternately to mask and unmask the 45° prisms 36 and 38, is driven in synchronism with the vertical pulse signals from the synchronization generator 70 which are also used to initiate the field sweep of the light spot in the cathode ray tube 32.

As may be seen, a novel system has been provided for facilitating the dissemination of recorded motion picture and television information to wide areas of the public. An extremely small film record is utilized, and the reproducing system incorporates features which render the system compatible with conventional television receivers as the ultimate reproducing means. The reproducing system provides a high degree of resolution and contains its own synchronization features which automatically synchronize the scanning of the film record to the movement of the film record. Other features are included to render uniform the signals ultimately produced that are transmitted to the television receivers used to reproduce the pictures and sound information contained on the film record.

From the description above, it is apparent that the invention is susceptible of being modified. Therefore, it should not be deemed limited except as it is defined in the following claims.

We claim:

1. In a system for reproducing picture information recorded in a series of successive frames of information disposed longitudinally on a film strip and sound information recorded on a sound track disposed longitudinally on the film adjacent to the frames of picture information, the combination therewith comprising:
  (a) means for moving the film strip through a scanning area,
  (b) first means for scanning, in accordance with an interrogation pattern independent of the mode of recording said information of said film strip, the scanning area in a series of successive scansions each of which substantially encompasses a frame of picture information on the film to generate signals representative of the information scanned,
  (c) means responsive to the signals generated by the first scanning means for generating a main video signal,
  (d) second scanning means for scanning a portion of the sound track concurrently with the scanning of the frames of picture information to generate a sound signal,
  (e) means for combining the sound signal and the main video signal to generate a composite signal suitable for direct application to a conventional television receiver, and
  (f) means responsive to the signals generated by the first scanning means for varying the frequency of the scansions of the scanning area.

2. In a system for scanning a record medium that contains information disposed thereon in a series of successive frames of information, the combination therewith comprising:
  (a) means for moving the record medium through a scanning area,
  (b) raster scanning means for scanning the scanning area in successive scansions each composed of longitudinally displaced line scans across the area to generate signals representative of the information on the record medium scanned thereby, and
  (c) means responsive to the signals generated by the scanning means for varying the scansions of the scanning area so that their frequency is related to the frequency at which the frames on the record medium move through the scanning area.

3. Apparatus as recited in claim 2, further comprising means for varying the portion of the scanning area that is scanned.

4. In a system for scanning a record medium that contains picture information disposed thereon in a series of successive frames and synchronization information disposed outside the frames of picture information, the combination therewith for generating signals representative of the picture information only, comprising:
  (a) means for moving the record medium through a scanning area,
  (b) raster scanning means for scanning a portion of the scanning area in successive scansions each composed of a series of longitudinally displaced line scans across the area to generate a first signal representative of the information on the portions of the record medium scanned thereby,
  (c) means for blanking a portion of the first signal corresponding to the synchronization information carried therein, thereby to transmit only information representative of the picture information disposed on the record medium,
  (d) means for deriving from the first signal that portion of the first signal representative of the synchronization information carried therein, and
  (e) means for varying the frequency of the scansions of the scanning area in response to the synchronization information derived from the first signal.

5. In a system for scanning a record medium that contains information disposed thereon in a series of successive frames of information, the combination therewith comprising:
  (a) means for moving the record medium through a scanning area,
  (b) means for scanning the scanning area in successive scansions each composed of longitudinally displaced line scans across the area to generate signals representative of the information on the record medium scanned thereby,
  (c) means for generating a first reference signal having a varying parameter at a predetermined time in each of said scansions,
  (d) means for generating a second reference signal each time one of a number of predetermined portions of the record medium that are associated with different frames of information is scanned, and
  (e) means for varying the scansions of the scanning area including:
    (1) means responsive to the second reference signal for sampling the varying parameter of the first reference signal, and
    (2) means responsive to the sampled parameter of the first reference signal for varying the scansions of the scanning area.

6. Apparatus as recited in claim 5, wherein
the first reference signal is a substantially triangular wave which generally increases and then decreases during one-half of each scansion and decreases and then increases for the other half of each scansion.

7. Apparatus as recited in claim 6, wherein
the second reference signal is generated by the means (d) when a portion of the record medium intermediate adjacent frames of information is scanned.

8. In a system for scanning a record medium that contains information disposed thereon in a series of successive frames of information, the combination therewith comprising:
  (a) means for moving the record medium through a scanning area,
  (b) means for scanning the scanning area in successive scansions each composed of longitudinally displaced line scans across the area to generate signals representative of the information on the record medium scanned thereby,
  (c) means for generating a first reference signal at a predetermined time in each of said scansions,
  (d) means for generating a second reference signal each time one of a number of predetermined portions of the record medium that are associated with different frames of information is scanned, and
  (e) means including first means responsive to the first and second reference signals for varying the frequency of the scansions of the scanning area.

9. Apparatus as recited in claim 8, wherein the first means varies the scansions of the scanning area comprises (1) first means for varying the frequency of the scansions of the scanning area so that such frequency is the same to the frequency at which the frames in the record medium move through the scanning area.

10. Apparatus as recited in claim 8, wherein the first means has a first time constant associated therewith, the second means (e) further includes means having a second time constant associated therewith for varying the location of the scansions in the scanning area to thereby scan substantially a complete frame on the record area for each scansion, and the first time constant is greater than the second time constant, whereby the response of the first means lags that of the second means.

11. In a system for producing signals by scanning a record medium that contains information disposed thereon in a series of successive frames of information, the frames being separated by indicia which result in the generation of a signal of predetermined frequency upon being scanned, the combination therewith comprising:

(a) means for moving the record medium through a scanning area, (b) means for scanning the scanning area in successive scansions each composed of longitudinally displaced line scans across the area to generate signals representative of the information on the record medium scanned thereby, (c) means for generating a first reference signal at a predetermined time in each one of a number of scansions, (d) means responsive to a signal of the predetermined frequency for generating a second reference signal, and (e) means jointly responsive to the first and second reference signal for varying the scansions of the scanning area.

12. Apparatus for reproducing information recorded on an elongated record member in sequential information-bearing segments spaced longitudinally on the member in its direction of elongation along with synchronizing indicia recorded thereon in association with the intervals between information-bearing segments, comprising:

(a) detector means for detecting the information in the information-bearing segments and the synchronizing indicia including (1) scanning means for cyclically scanning the record member in a raster scan composed of a series of longitudinally displaced line scans across the record member in the scanning area, the scanning means scanning the information-bearing segments and the synchronizing indicia and including means for controlling the longitudinal displacement of the line scans in the scanning area to generate the raster at a given cyclical rate, (b) drive means for driving the record member continuously in its direction of elongation past the detector means to thereby present to the detector means a continuously moving image of the information bearing segments and the synchronizing indicia, (c) signal generating means responsive to the detector means to generate first signals representative of the information recorded in the information-bearing segments on the record member and to generate second signals in response to the detection of the synchronizing indicia, and (d) means for applying the second signals to the line scan displacement control means to regulate the cyclical rate of the raster scan so that each of the segments is scanned by one raster scan in the scanning area.

13. Apparatus for reproducing information recorded on an elongated record member in sequential information-bearing segments spaced longitudinally on the member in its direction of elongation along with synchronizing indicia recorded thereon in association with the intervals between information-bearing segments, comprising:

(a) detector means for detecting the information in the information-bearing segments and the synchronizing indicia including (1) scanning means for cyclically scanning the record member in a raster scan composed of a series of longitudinally displaced line scans across the record member in the scanning area, (2) means for initiating the longitudinal displacement of the raster line scan series in the scanning area at a given cyclical rate, (b) drive means for driving the record member continuously in its direction of elongation past the detector means so that the scanning means scans continuously moving images of each information-bearing segment and the synchronizing indicia, (c) signal generating means responsive to the detector means to produce signals in response to detection thereby of the synchronizing indicia associated with the intervals between information-bearing segments, and (d) control means responsive to the signal generating means to control the raster initiating means so as to regulate the cyclical rate of the raster scan to reproduce the information-bearing segments at the desired rate.

14. Appartus according to claim 13, wherein the control means (d) includes (1) means for generating a corrective action which assures the initiation of scanning of each information-bearing segment as that segment reaches a predetermined location along the direction of motion of the record member with respect to the detector means.

15. In apparatus for reproducing information recorded on an elongated record member in sequential information-bearing segments spaced longitudinally on the member in its direction of elongation, synchronizing indicia also being recorded on the record member, the combination of:

(a) detector means for detecting the information in the information-bearing segments including (1) scanning means for cyclically scanning the record member in a raster scan composed of a series of longitudinally displaced line scans across the record member in the scanning area, (2) means for initiating the longitudinal displacement of the raster line scan series in the scanning area at a given cyclical rate, (b) drive means for driving the record member in its direction of elongation past the detector means to thereby present to the detector means continuously moving images of the information-bearing segments and synchronizing indicia, (c) means for detecting movement of the synchronizing indicia, and (d) means responsive to the movement detecting means to control the raster initiating means so as to regulate the cyclical rate of the raster scan to synchronize the scanning effected by the scanning means with the movement of the record member.

(References on following page)

References Cited by the Examiner

UNITED STATES PATENTS

| | | | |
|---|---|---|---|
| 2,128,078 | 8/1938 | Davis | 178—5.6 |
| 2,189,351 | 2/1940 | Schroter | 178—7.2 |
| 2,299,738 | 10/1942 | Collins | 178—5.6 |
| 2,408,293 | 9/1946 | Carmel | 178—6.7 |
| 2,677,012 | 4/1954 | Bach | 178—6.7 |
| 2,681,382 | 6/1954 | Hilburn | 178—6.7 |
| 2,719,247 | 9/1955 | Bedford | 178—6.7 |
| 2,775,644 | 12/1956 | Mandel | 178—7.2 |
| 2,779,819 | 1/1957 | Graham et al. | 178—7.2 |
| 2,817,702 | 12/1957 | Graham | 178—7.2 |

| | | | |
|---|---|---|---|
| 2,818,466 | 12/1957 | Larson | 178—7.2 |
| 2,890,277 | 6/1959 | Duke | 178—7.2 |
| 2,912,487 | 11/1959 | Horsley | 178—5.2 |
| 2,976,354 | 3/1961 | Banning | 178—5.6 |
| 3,137,768 | 6/1964 | Mullin | 178—6.6 |

OTHER REFERENCES

Fink: Television Engineering Handbook, McGraw-Hill, 1957, pp. 17–52 through 17–55.

DAVID G. REDINBAUGH, *Primary Examiner.*

R. M. HESSIN, J. A. O'BRIEN, *Assistant Examiners.*

UNITED STATES PATENT OFFICE

CERTIFICATE OF CORRECTION

Patent No. 3,290,437 December 6, 1966

Peter C. Goldmark et al.

It is hereby certified that error appears in the above numbered patent requiring correction and that the said Letters Patent should read as corrected below.

Column 9, lines 3 to 5, strike out "the scansions of the scanning area comprises (1) first means for varying"; same column 9, line 13, strike out "second"; same line 13, after "includes" insert -- second --.

Signed and sealed this 22nd day of October 1968.

(SEAL)
Attest:

Edward M. Fletcher, Jr.
Attesting Officer

EDWARD J. BRENNER
Commissioner of Patents